United States Patent [19]

Luck et al.

[11] Patent Number: 4,794,389
[45] Date of Patent: Dec. 27, 1988

[54] ATTRIBUTE HIERARCHY SYSTEM

[75] Inventors: Melvin R. Luck; Mark J. Pavicic, both of Rochester, Minn.

[73] Assignee: IBM Corporation, Armonk, N.Y.

[21] Appl. No.: 919,654

[22] Filed: Oct. 16, 1986

Related U.S. Application Data

[63] Continuation of Ser. No. 573,394, Jan. 24, 1984, abandoned.

[51] Int. Cl.[4] .............................................. G09G 1/00
[52] U.S. Cl. ................................... 340/723; 340/747; 340/799
[58] Field of Search ............... 340/750, 747, 798, 799, 340/703, 723, 790, 734, 735

[56] References Cited

U.S. PATENT DOCUMENTS

| | | | |
|---|---|---|---|
| 4,163,229 | 7/1979 | Bodin et al. | 340/799 |
| 4,317,114 | 2/1982 | Walker | 340/799 |
| 4,342,096 | 7/1982 | McDevitt | 340/750 |
| 4,418,343 | 11/1983 | Ryan et al. | 340/723 |

OTHER PUBLICATIONS

IBM Tech. Discl. Bull.; Nicholson et al; vol. 21, No. 1; pp. 295-296; 6/78.
*An Introduction to Microprocessors*, Osborne; 1980; pp. 6-42 to 6-50.

Primary Examiner—Marshall M. Curtis
Attorney, Agent, or Firm—Hugh D. Jaeger

[57] ABSTRACT

Attribute hierarchy system including hardware assisted by software for utilizing a stack structure of a multiple-level stack and a plurality of stacks for storing data and attributes. The stack structure provides that only the top of the stack is loaded and utilized. The software controls the hardware logic flow associated with the stack and the stacks. The hardware includes an attribute memory and character data storage, a character data counter and position register. An attribute mask and attribute processor control loading of the attributes. A command register pushes, pops or loads to the stacks along with a sequence controller input from the attribute processor. A command decoder determines sequence of operation for loading attributes and character into row buffers. A stack control flags when a valid load has occurred, and if no load occurred, the stack defaults and a copy operation occurs.

8 Claims, 6 Drawing Sheets

ATTRIBUTE HIERARCHY SYSTEM

This application is a continuation of application Ser. No. 573,394, filed 01/24/84 now abandoned.

TECHNICAL FIELD

This invention relates to video displays for alphanumeric data, and more particularly pertains an attribute hierarchy system providing levels of attributes and commands for controlling the attribute levels.

BACKGROUND ART

In the field of alphanumeric video displays, an "attribute" is a modifiable aspect of a displayed character, such as blinking, intensified, reverse video, underlined, and protected against overwriting.

The prior art has been oriented toward utilizing holding buffers in conjunction with current-attribute buffers for storing an attribute code or codes until called for. This type of software programming and hardware architecture has not provided for any program control as the operation is predetermined. The prior art with considerable brute-force techniques would allow for underlining characters or striking out characters, various types of formatting of material in a text, and any of the other attributes as performed in the prior art operations.

The prior art required that the old attribute had to be respecified at the end of the field, which required considerable storage for attributes as previously utilized. Further, there was considerable software searching the data to find the last valid attribute, which not only required additional storage, but also required additional time, both of the storage hardware and software searching time leading to inefficient data processing.

The present invention overcomes the disadvantages of the prior art by providing hardware assist controlled by software reducing the number of bytes for levels of attributes and commands to control the attribute levels.

DISCLOSURE OF THE INVENTION

The present invention provides hardware assisted by software in storing levels of attributes and generating command signals to move the levels in being pushed down into a stack or popped up into the stack. The levels of attributes and commands to control the attribute levels can be expanded accordingly, dependent upon the number of bytes available in the system. This system provides handling, control, and implementation of attribute hierarchy, reducing display storage requirements including bandwidth and size, and reduces the required software to manage the attributes.

According to one embodiment of the present invention, "n" position stack is provided with hardware logic flow which specifies loading of an attribute when entering a new attribute field, each attribute is pushed down into the stack, and the previous attribute does not have to be respecified at the end of the field. A pop-up command to the stack restores the preceding attribute to its previous level. The level of the "stack" determines the levels of attribute hierarchy. The hardware logic flow assisted by the software determines the use of any "end" attribute levels. A set of commands provides the required hardware-software interface providing that the software controls the stack and the hardware attributing process through the hardware logic flow. A set of commands and functions provides hardware control through the software for keying, loading, and specifying end of field. A plurality of stacks can be provided where each stack can also have a plurality of levels.

One significant aspect and feature of the present invention is that this attribute hierarchy system providing hardware assisted by software is applicable to the industry standard attributes, such as color, reversing, underscoring, blinking, blanking, and intensity, as well as the more complex attributes including over-striking of characters, changing box width or box height, magnification, and other attributes.

Another significant aspect and feature of the present invention is an attribute hierarchy system which reduces the amount of disk storage space, saves required storage, and saves software time in the software controlling the hardware.

DESCRIPTION OF THE INVENTION

Figure 1A:
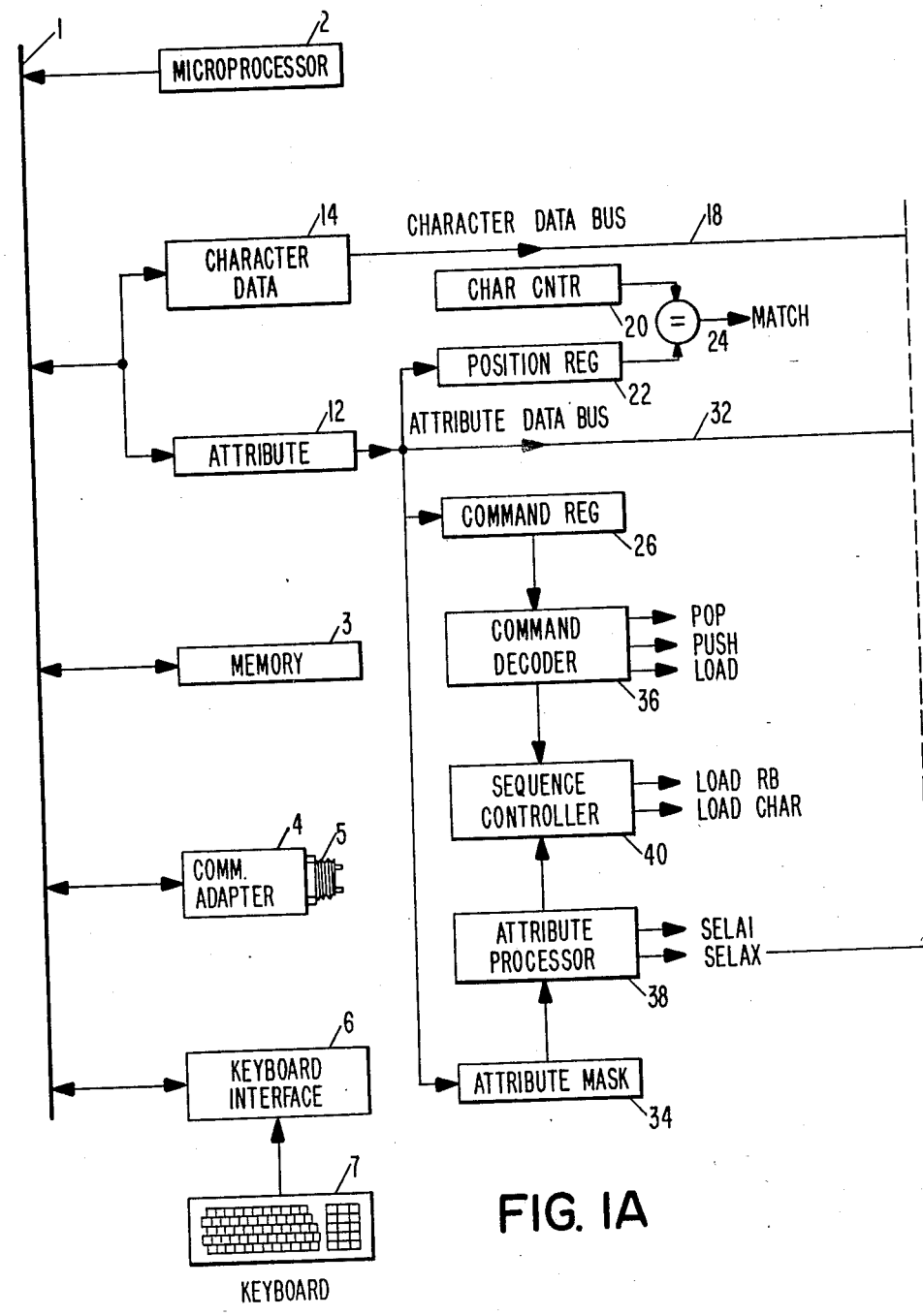
FIGS. 1A and 1B illustrate the hardware for the attribute hierarchy system.
Figure 1B:
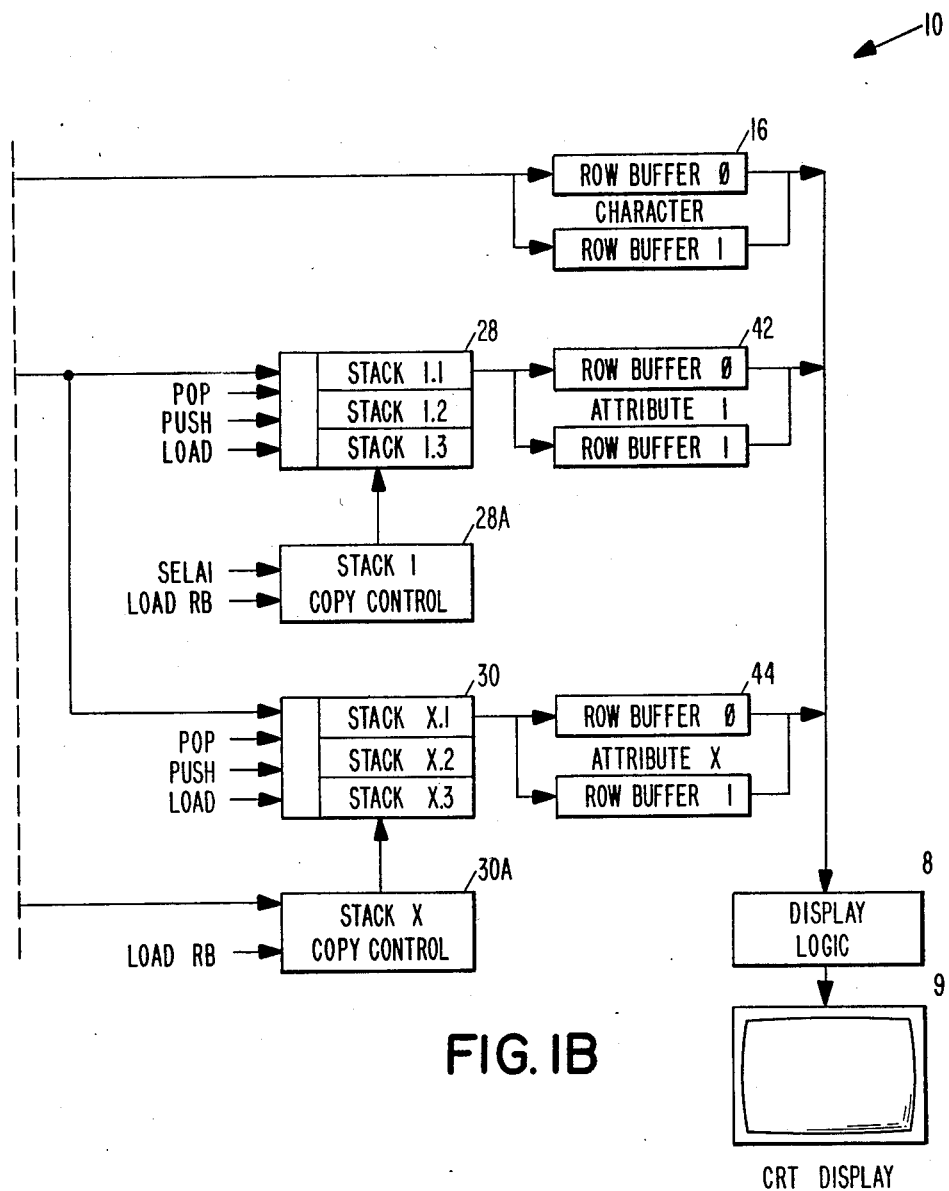

FIG. 1 illustrates a microprocessor-controlled video display terminal for alphanumeric data. The conventional portion of the terminal has a data/address/control bus 1 for interconnection of a microprocessor 2, a storage device such as memory 3 for read/write and/or read-only storage of data, a communications adapter 4 connected to a host data processor via a cable 5, and a keyboard interface 6 for receiving input data from a keyboard 7. Display logic 8 provides conventional timing and signal conversion functions for a raster-scanned cathode-ray-tube (CRT) display 9.

Attribute hierarchy hardware 10 according to the present invention is coupled between bus 1 and display logic 8. Character data storage 14 stores byte-length codes signifying the identities of the characters to be displayed on CRT 9, while attribute storage 12 stores byte-length codes specifying the attributes such as blinking, intensified, underlined, etc., with which the characters are to be displayed.

The storages 12 and 14 can be included in the same storage device. Row buffers 16 receive characters from the storage 14 over the character data bus 18 for subsequent transfer to display 9 through display logic 8. A match signal is generated, signaling when to apply an attribute, through signals from a character counter 20, a position register 22, and an AND gate 24. Command register 26 receives a command preceding each attribute string whereupon the attributes go to a stack 28, the first stack in this example. Any number of stacks can be provided and the last stack would be designated stack 30, by way of example and for purposes of illustration only, and not to be construed as limiting of the present invention. In this particular example, for purposes of illustration, a three-level stack has been illustrated, but any number of levels can be provided. Attribute data bus 32 carries the attributes to the stacks 28 and 30. Attribute mask 34 provides signals as to what attributes follow and how many attributes follow. Command decoder 36 and attribute processor 38 feed to the sequence controller 40 which provides load row buffer and load character signals. For purposes of definition, "push" means that an attribute is moved from stack 1.1 to stack 1.2 and "pop" means that an attribute is moved from stack 1.2 to 1.1. Stack copy control 28a and 30a is evaluated whenever a load signal is received by the stacks 28 and 30 respectively. Row buffers 42 and 44 connect respectively to the outputs of the stacks and connect to the display logic. In the alternative, the stacks and buffers could be configured to drive a display directly.

A set of commands provides the hardware with logic flow through the software assist for controlling the stack and hardware attribute processing. In this particular example, a set of eight command signals is optimal for hardware and software of the attribute hierarchy system. The commands provide for proper hardware control through the software by the use of three efficiently coded bits. A list of commands and functions follows:

|  |  | KEY |  |
|---|---|---|---|
|  | L | Load attributes (only attributes 1–4) |  |
|  | LL | Load attribute Long (any attributes 1–31) |  |
|  | * | Load character data & Load Row Buffer |  |
|  |  | DECODE |  |
|  | 000 | N | No op |
|  | 001 | U | Pop Up |
|  | 010 | LLD | Load attribute Long and push Down |
|  | 011 | LD | Load attribute and push Down |
|  | 100 | LL*U | Load attribute Long, Load Char & RB, and pop Up |
| LOAD CMDS | 101 | L*U | Load attribute, Load Char & RB, and pop Up |
|  | 110 | LL* | Load attribute Long and load Char & RB |
|  | 111 | L* | Load attribute and load Char & RB |

One additional bit is used to determine the end of the command string. The end of string (EOS) flag allows several commands to appear in one string.

| FUNCTION | COMMAND USED |
|---|---|
| Specifying Attributes: Viewport, Screen, or Default | LD or LLD |
| Field | LD or LLD |
| Character (Single Position) | L* or LL* |
| Specifying End of Field: Field only | U or L*U or LL*U |
| Field and Character | L*U or LL*U |

The command, attribute mask, and attributes are combined and compressed into an attribute string which is stored by the attribute memory 12. The first byte of each attribute string is a position number corresponding to the position in the data memory for which that attribute string is to be applied. When a match occurs between the character data counter 20 and the position register 22 the command and attribute mask are outputted. That attribute mask determines the attributes which follow while the attribute processor 38 controls the loading of the attributes. Command decoder 36 of the command register 26 determines the operations of PUSH, POP, and LOAD for the stacks 28 and 30. The sequencer controller 40 with inputs from the attribute processor 38 and the command decoder 36 generates load RB and load char signals specifying when to parallel load all of the attributes into the row buffers 42 and 44 and the character into row buffering. The stack controls 28A and 30A flag for each stack when a valid load has occurred, but if no load occurred, the stacks automatically default and a copy operation takes place.

Figure 2:
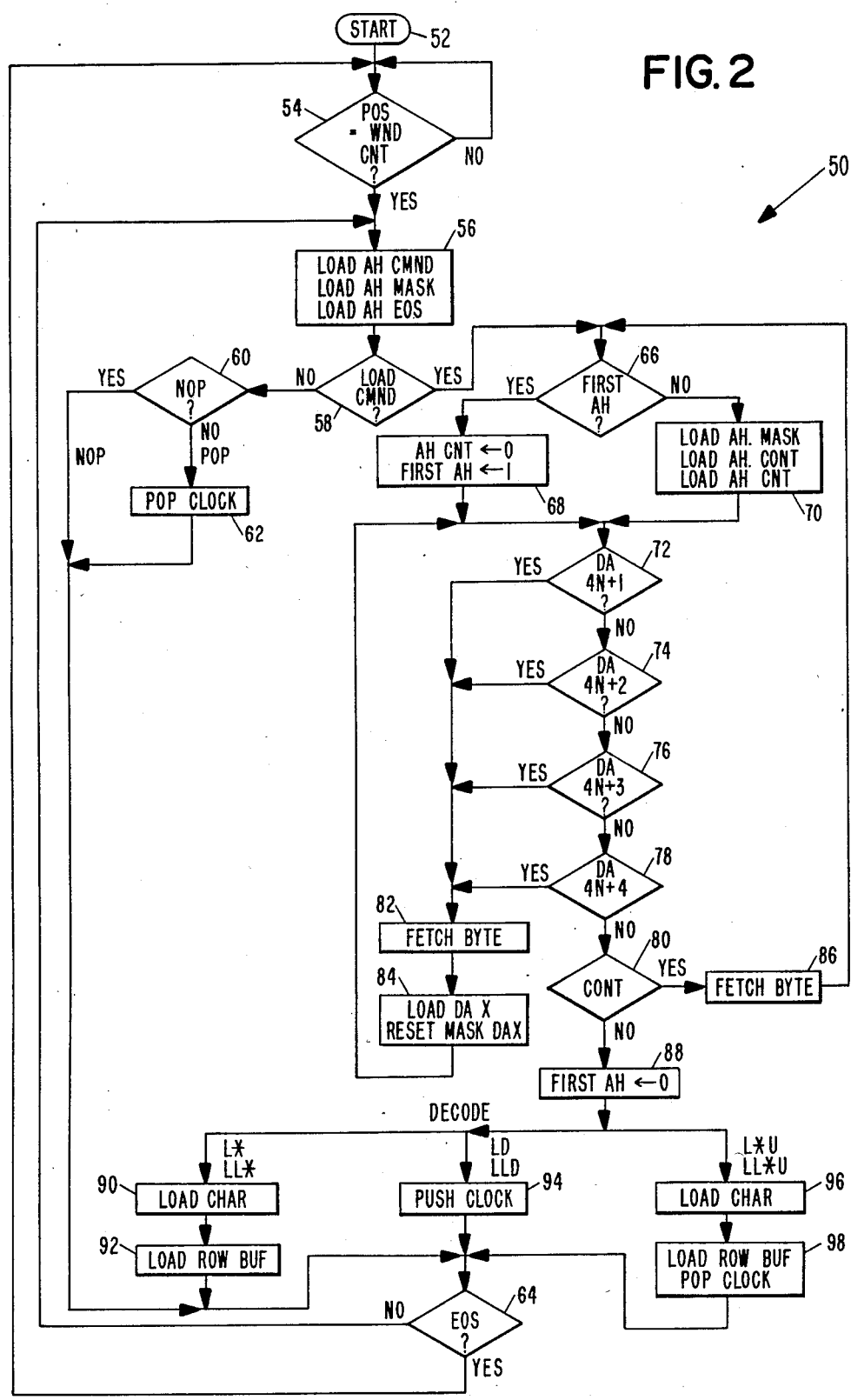
FIG. 2 illustrates the hardware logic flow for the attribute hierarchy system in FIG. 1.

FIG. 2 illustrates a hardware logic flow for the command decoder and sequence controller 50 for the attribute hierarchy system. After the start 52, hardware character counter 20, position register 22 and command register 26 receives position, command, and character count at box 54. Box 56 receives the load command, the masking which includes the attributes and how many attributes follow, and a single bit end of string flags, which occurs at the end of the command string thereby allowing several commands to appear in one condition string. At box 58, detection of other than a load command results in a "No" decision, leading to the no operation (NO OP) test of box 60. If a NO OP is found, a "YES" decision is produced. Otherwise, a no decision results and a pop clock signal, box 62, is produced. Both the NO OP and pop clock signals ultimately lead to the end of string test of box 64. Detection of a load command at box 58 results in a "Yes" output, attribute processing masking logic leading to boxes 66–88 for attribute processing and masking.

Detection of the first attribute header at box 66 leads to box 68 and generation of a signal indicating same. If is not the first attribute header, box 70 generates the appropriate signals, the data attribute is determined by boxes 72–80. Boxes 82 and 84 fetch the appropriate byte, load the data attribute at box 84, and reset the mask. Depending upon the particular load command, boxes 90–98 generate the load character signal, load row buffer signal, and push or pop the attribute through the load buffer.

Figure 3:
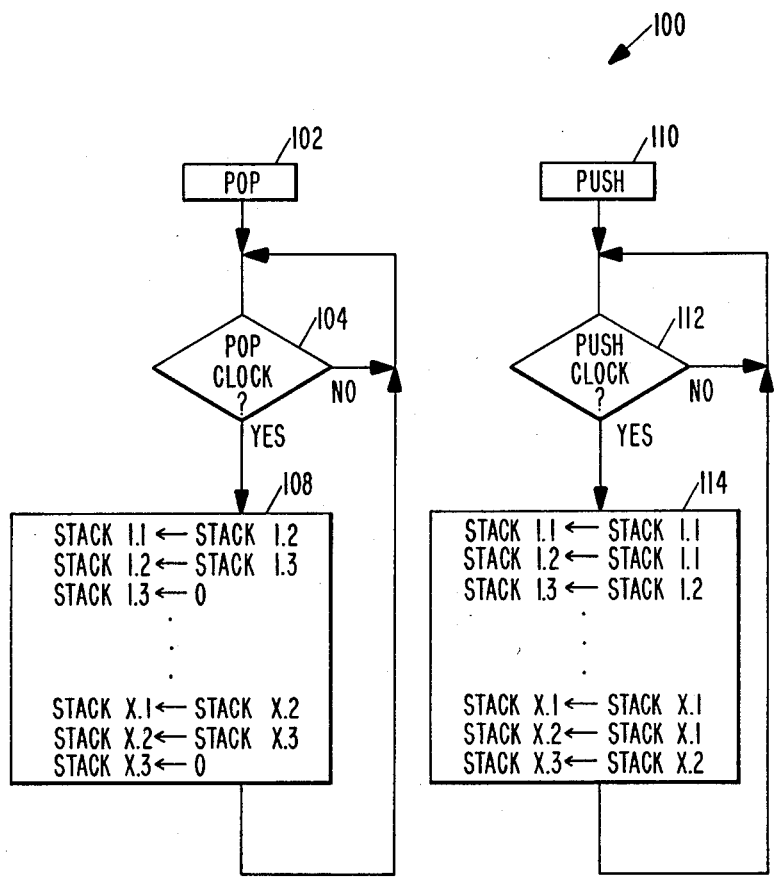
FIG. 3 illustrates hardware logic flow for operations to stack including pop and push.

FIG. 3 illustrates a logic flow chart 100 for the level setting means which effect POP and PUSH stack operators. The flow chart assumes a three-level stack, by way of example and for purposes of illustration only and not to be construed as limiting of the invention. A pop command 102 will require detection of a pop clock signal at box 104 to move an attribute in the stack, as illustrated in 108. Likewise, a push command 110 requires a detection or a push signal at box 112 to move the attribute in the stack 114.

Figure 4:
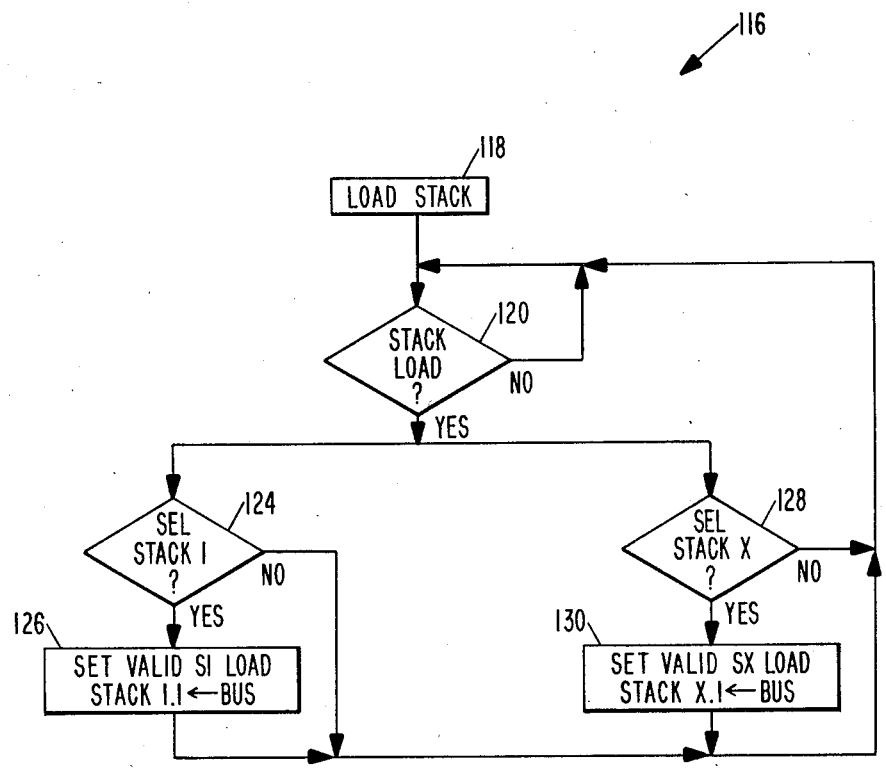
FIG. 4 illustrates hardware logic flow for operation to stack/load.

FIG. 4 illustrates a hardware logic flow chart 116 for stack-load operation. Detection of a load stack signal 118 from command decoder 36 at box 120 allows a stack to be selected in accordance with the test at boxes 124 and 128. The stack boxes 124 through 128 to be loaded is determined by the yes output from the SEL Stack 1 to SEL Stack X. A load signal is set by 126 and 130.

Figure 5:
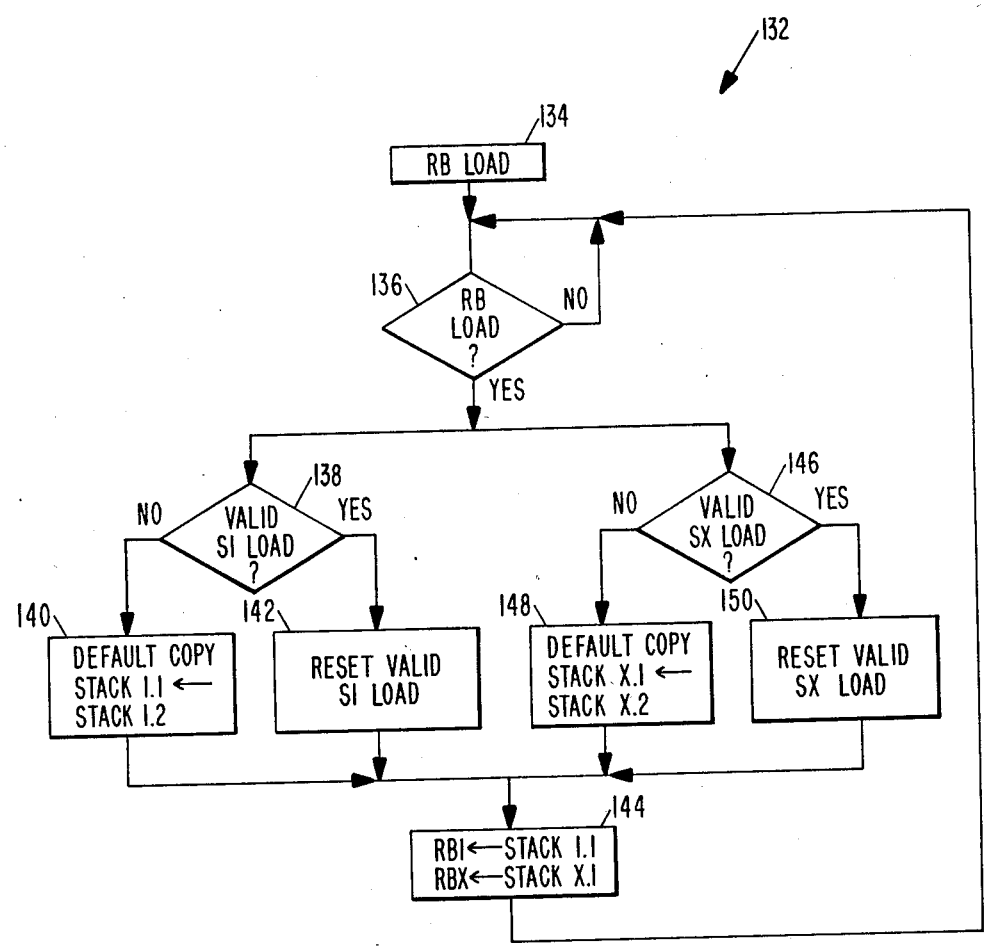
FIG. 5 illustrates hardware logic flow for the stack copy controller.

FIG. 5 illustrates a hardware logic flow chart 132 for the stack copy control 28A and 30A for loading the row buffers 16, 42, and 44. Detection of a row buffer load signal at box 136, provides an input to box 138 to test for and determine whether a default copy is to occur. In the absence of a valid load, default copy 140 provides an automatic positional attribute which defaults to the next level up. A valid load provides reset of the valid stack 1 load at box 142. Box 144 provides for the stacking in the appropriate row buffer. Decisions of 146, 148, and 150 provide corresponding decision for other row buffers.

We claim:

1. Display system having attribute commands for modifying appearances of displayed data by attributes comprising:

a. stacking means comprising a plurality of stack memories for storing a plurality of attribute strings, each attribute string including one byte which includes at least one command signal and at least one attribute mask;
b. means for evaluating each attribute string responsive to a load signal and means for controlling the stack of said attribute strings in said stacking means; and,
c. command means connected to said level setting means for reading said command signal of each attribute string and means responsive to said command signal for moving each of said attribute strings through levels in said stacking means and means for setting levels of priority of said attribute strings in said stacking means whereby each of said command signal precede each of said levels of said attribute strings.

2. System of claim 1 comprising:
a. loading means for loading attributes in said stack means;
b. pushing means for pushing said levels of attributes down in said stack means; and,
c. popping means for popping up said levels of attributes in said stack means.

3. System of claim 1 wherein said command signal means codes said signals into three bits.

4. System of claim 1 comprising means connected to said command means for generating an end of command string bit each of for said attribute strings.

5. Attribute hierarchy system comprising:
a. storage means for storing character data;
b. buffering means for said stored character data and bus means for transferring said character data from said storage means to said buffering means;
c. storage means for storing attribute strings, each attribute string including at least one command and at least one attribute mask in one byte;
d. signal generation means connected to said character storage means and said attribute storage means for generating a match signal;
e. bus means for transferring each of said attribute strings from said attribute storage means;
f. means for registering command codes in said attribute strings and connected to said attribute bus means;
g. masking means for masking each of said attribute strings as a function of the number of said attributes in each of said attribute strings, and connected to said attribute bus means and means for generating a masking control signal and including means responsive to load signal connected between said sequence control means and said processor means for controlling said stacking means;
h. decoding means for decoding said command signals connected to a command register means and generating pop, push, and load signals;
i. attribute string processor means connected to said attribute masking means for generating a stack select signal in response to said mask signal;
j. sequence control means for sequence controlling of said attribute strings and connected between said command decoding means and said attribute processor means, and generating load row buffer and load character signals for said stacking means;
k. stacking means connecting said attribute storage means and said attribute bus means for stacking said attribute strings, said stacking means receiving said pop, push, and load signals for each of said attribute strings; and,
l. buffering means for said attribute strings connected between said stacking means and a display means for holding said attribute string which inputted from said stacking means.

6. System of claim 5 wherein said stacking means comprises a plurality of stacking means connected to said attribute data bus means.

7. System of claim 5 wherein each of said stack means includes plurality of levels.

8. System of claim 5 comprising stack copy control means connected to said stacking means and receiving said select attribute string and said load row buffer signal.

* * * * *